United States Patent [19]
Berg

[11] 4,121,840
[45] Oct. 24, 1978

[54] SEAL ASSEMBLY

[75] Inventor: David W. Berg, Wayzata, Minn.

[73] Assignee: Tol-O-Matic Inc., Minneapolis, Minn.

[21] Appl. No.: 848,466

[22] Filed: Nov. 4, 1977

Related U.S. Application Data

[63] Continuation-in-part of Ser. No. 758,043, Jan. 10, 1977, Pat. No. 4,057,257.

[51] Int. Cl.² .......................... F01B 9/00; F16J 15/18
[52] U.S. Cl. ........................................ 277/4; 277/9; 277/51; 277/165; 277/205; 92/137; 92/165 R; 173/147
[58] Field of Search ............... 277/4, 9, 11, 35, 47–51, 277/59, 58, 124, 165, 177, 178, 183, 185, 186, 188 R, 189, 205, 228; 92/137, 165 R, 166, 168; 173/144, 147

[56] References Cited

U.S. PATENT DOCUMENTS

| 2,235,289 | 3/1941 | Dunn et al. | 277/205 X |
|---|---|---|---|
| 2,652,575 | 9/1953 | Bukolt | 277/47 X |
| 2,926,938 | 3/1960 | Ratti | 277/47 X |
| 3,013,824 | 12/1961 | Wilson | 277/4 X |
| 3,154,309 | 10/1964 | Voitik | 277/51 X |
| 3,269,737 | 8/1966 | Freese | 92/165 R X |
| 3,667,552 | 6/1972 | Gordon | 92/137 X |
| 3,717,071 | 2/1973 | Gordon | 92/137 |

FOREIGN PATENT DOCUMENTS

| 496,641 | 10/1953 | Canada | 277/9 |
|---|---|---|---|
| 727,099 | 3/1955 | United Kingdom | 277/35 |

Primary Examiner—Robert S. Ward, Jr.
Attorney, Agent, or Firm—Dorsey, Windhorst, Hannaford, Whitney & Halladay

[57] ABSTRACT

A seal assembly for use in a cable cylinder to form an effective seal about a generally cylindrical cable section. The seal assembly includes primary and secondary seal members disposed on opposite sides of an alignment sleeve and a retainer sleeve, all of which are disposed within the central bore of a gland member. The central bore includes a plurality of cylindrical bore portions and means cooperating with the retainer sleeve for retaining the seal members and alignment sleeve within the gland for easy insertion and removal thereof.

10 Claims, 3 Drawing Figures

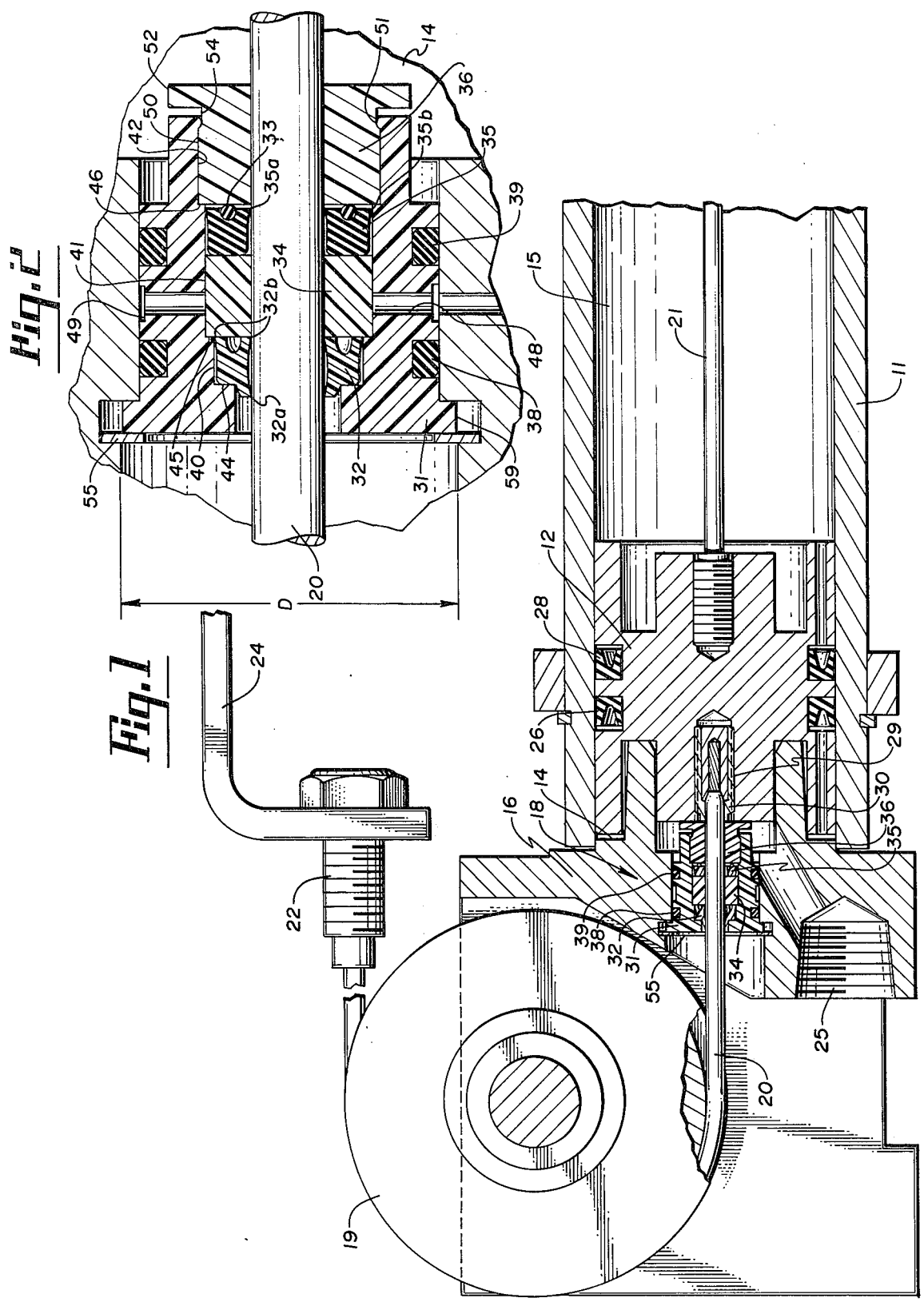

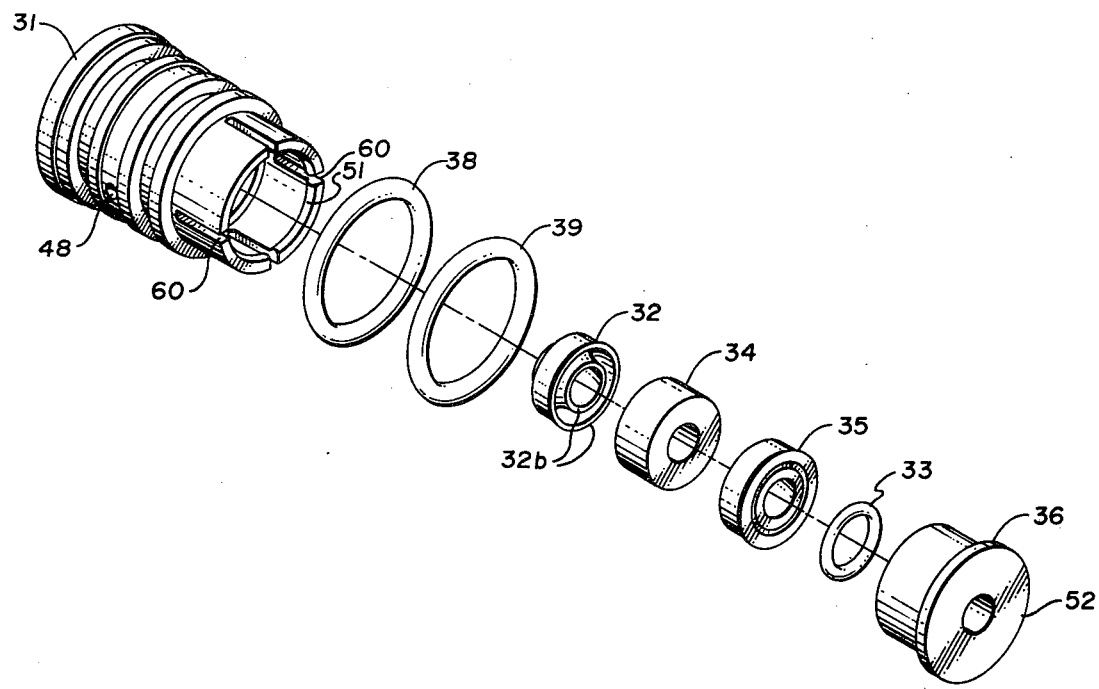

SEAL ASSEMBLY

This application is a continuation-in-part of Ser. No. 758,043 filed Jan. 10, 1977, now U.S. Pat. No. 4,057,257.

BACKGROUND OF THE INVENTION

The present invention relates generally to an improved seal assembly and more particularly, to an improved seal assembly for use in a cable cylinder to prevent leakage from a pressurized pneumatic or hydraulic fluid chamber.

Cable cylinders of the prior art comprise an elongated cylinder member containing a piston movable within the cylinder from one end to the other. Such movement is responsive to appropriate introduction of a pressurized fluid into portions of the elongated cylinder. A pair of cable sections extend from the ends of the piston and around a corresponding pair of end pulleys where they are joined together by a clevis or other connection means. Disposed at each end of the cylinder is a seal assembly forming a seal about the exterior surface of the cable to prevent pressurized fluid from leaking out of the cylinder. Many types of seal assemblies have been used in cable cylinders to accomplish this sealing function. Most of these contain a plurality of seal elements which are retained via a gland or other means within a portion of the cable cylinder housing by means which are semi-permanent or very difficult to get at. Due to the general inaccessibility of the seal elements and the means retaining them within the cylinder housing, it is very difficult and time consuming to inspect, replace and/or repair the seal elements. Accordingly, there is a real need in the art for a seal assembly usable in connection with a cable cylinder which not only functions as an effective seal about the cable cylinder, but which is also comprised of elements which are readily accessible for repair and/or replacement and which can be quickly and easily disassembled and reassembled when the same is desired.

SUMMARY OF THE INVENTION

In contrast to the prior art, the present invention comprises a seal assembly for use in a cable cylinder which not only forms an effective seal about the generally cylindrical cable, but which also is readily and easily assembled and disassembled and is accessible for inspection, repair and/or replacement.

More particularly, the seal assembly of the present invention includes a gland which is designed to fit within the cable cylinder housing and which has a centrally located bore with a plurality of generally cylindrical bore portions. The centrally located bore is disposed generally coaxially with the cylindrical cable and has one end disposed toward and one end disposed away from the pressurized chamber. The end of the cylindrical bore disposed toward the pressurized chamber includes a small inwardly disposed shoulder or rib portion for appropriate engagement with a corresponding portion of a retaining sleeve member. The retaining sleeve fits within a first cylindrical portion of the bore and functions to retain the various seal elements within the gland member. A first or primary seal element is disposed adjacent to the retaining sleeve and on the side of such sleeve away from the pressurized chamber. This primary seal is disposed in a second cylindrical portion of the bore and functions to prevent the loss of hydraulic fluid from the pressurized chamber. An alignment sleeve or disc member is positioned adjacent to the primary seal and within the same cylindrical bore portion. The alignment sleeve engages a shoulder portion of the gland preventing longitudinal movement of the sleeve and the primary seal which it supports during corresponding movement of the cable. A secondary seal element is disposed adjacent to the alignment sleeve within a third cylindrical bore portion of the gland and is adapted for engagement with one end of the alignment sleeve and a shoulder portion of the gland. The entire seal assembly including the gland member, the primary and secondary seals, the alignment sleeve and the retaining sleeve are held within the cable cylinder housing by an appropriate lock ring.

With the above structure, the primary and secondary seal members and the alignment sleeve are removably retained within the gland by the retaining sleeve member. When disassembly of the seal is desired, an appropriate manual force is exerted on the retainer sleeve member causing such retainer to snap out of the mechanical lock of the gland and allowing the seal members and the alignment sleeve to be removed. If assembly of the seal elements is desired, they are placed onto the cable in appropriate order and a manual force is applied to the retainer sleeve element in a direction away from the pressurized chamber, thus causing mechanical locking of the retainer with the gland.

Accordingly, it is an object of the present invention to provide an improved seal assembly for use in a cable cylinder which is easily assembled and disassembled.

A further object of the present invention is to provide an improved seal assembly for use in a cable cylinder in which the various elements of the seal assembly are readily accessible for inspection, repair and/or replacement.

Another object of the present invention is to provide an improved seal assembly for use in a cable cylinder in which the seal elements are removably retained within a gland member by a retainer sleeve member mechanically held in position by a portion of the gland.

These and other objects of the present invention will become apparent with reference to the drawings, the description of the preferred embodiment and the appended claims.

DESCRIPTION OF THE DRAWINGS

FIG. 1 is a plan view of one end of a cable cylinder, partially in section, showing the relationship between the seal assembly of the present invention and the cable cylinder.

FIG. 2 is a sectional view of the seal assembly of the present invention mounted within the cable cylinder housing.

FIG. 3 is an exploded view of the various components comprising the seal assembly of the present invention.

DESCRIPTION OF THE PREFERRED EMBODIMENT

Reference is first made to FIG. 1 which shows a portion of a cable cylinder and the relationship between the seal assembly of the present invention and such cable cylinder. In general, the cable cylinder illustrated in FIG. 1 includes a generally elongated cylindrical tube 11 forming a hydraulic cylinder. A piston assembly 12 is housed within the cylinder 11 and is adapted for reciprocal movement back and forth therein. The piston assembly 12 defines a pair of fluid chambers 14 and 15 at each end of the cylinder 11 which may be pressurized either pneumatically or hydraulically. An end housing or section 16 is positioned at each end of the cylinder where it is appropriately connected with one end of the cylinder 11. The housing 16 functions to house a seal assembly 18 and to rotatably support a pulley 19. A pair of cable sections 20 and 21 are connected to opposite ends of the piston assembly 12 and extend from such assembly through the seal assembly 18 and around the pulley 19 positioned at opposing ends of the cable cylinder. The other ends of the cable sections 20 and 21 are connected by appropriate means 22 to a clevis or other connecting bracket 24.

Each of the end sections 16 includes means for providing appropriately pressurized fluid to the respective chambers 14 and 15. In the preferred embodiment, this means includes an appropriate supply port and conduit 25.

During operation, pressurized fluid is supplied via one of the ports 25 to its respective chamber 14 and 15 resulting in corresponding movement of the piston assembly 12 along the cylinder tube 11. Movement of the piston assembly in this manner results in movement of the cable sections 20 and 21 and corresponding movement of the connecting bracket 24. When pressurized fluid is being supplied to one of the chambers 14 and 15, the other chamber is being drained of fluid through its respective port 25. The connecting bracket 24 is adapted for connection to an appropriate tool or other device to which reciprocating motion is desired to be imparted.

The piston assembly 12 includes a pair of cup seal members 26 and 28 extending about its periphery to form an effective seal between the piston assembly 12 and the inner surface of the cylinder 11 to define the chambers 14 and 15. Each of the piston assembly 12 also includes an internally threaded hole 29 adapted to threadedly receive a cable connecting fitting 30.

As illustrated in each of FIGS. 1-3, the seal assembly 18 comprises a generally cylindrical gland member 31, a first or primary seal member 35, an annular alignment sleeve 34, a secondary seal member 32 and a retaining sleeve member 36. As illustrated best in FIGS. 1 and 2, the gland member 31 is designed to fit within a portion of the housing or end member 16. One end of the gland member 31 includes a peripheral shoulder portion 59 adapted for appropriate engagement with a portion of the cylinder housing to properly position and orient the gland 31 within the end housing 16. The gland is retained in this position by a conventional lock ring 55 which is contracted for insertion into a retaining groove in the housing 16. A pair of "O" rings 38 and 39 are appropriately positioned in "O" ring seats about the periphery of the gland member 31 to prevent leakage of hydraulic fluid between the gland 31 and the housing 16.

With principal reference to FIG. 2, it can be seen that the gland 31 includes an inner centrally located bore having a plurality of generally cylindrical bore portions, 40, 41 and 42, each extending around the cylindrical cable section 20. The gland 31 also includes an inwardly extending shoulder portion 44 adjacent to the cylindrical bore portion 40 and near one end of the gland 31 for engagement by a secondary seal member 32. When the gland 31 is properly secured within the housing 16, the longitudinal axis of the elongated bore of the gland is coaxial with the cable section 20. Also, when the gland 31 is properly positioned within the housing 16, the shoulder portion 44 is at the end of the gland bore opposite or away from the pressurized chamber 14. In the preferred embodiment, the gland 31 is constructed of a material such as Delrin or its equivalent. Delrin is a trademark owned by E. I. DuPont deMours & Co., Inc. for an acetal-resin product.

Positioned adjacent to the shoulder portion 44 and within the cylindrical bore portion 40 is a secondary seal member 32. The seal member 32 is a wiper-type seal member having a first or outer edge 32a adapted for sealing or wiping engagement with the outer surface of the cylindrical cable section 20 and a pair of second or inner edges 32b adapted for sealing engagement with the exterior surface of the cable section 20 and the inner cylindrical surface of the bore portion 40. One of the principal functions of the seal member 32, as will be described below, is to prevent the oil which might leak past the primary seal 35 from leaking out of the seal assembly. This function is accomplished by the edges 32b. Another function of the seal member 32 is to keep dust and dirt from entering the interior of the seal assembly. This is accomplished by the sealing edge 32a which acts as a wiper edge against the exterior surface of the cable 20. As illustrated in FIG. 2, seal member 32 is retained within the bore section 40 by the shoulder portion 44 and the alignment sleeve 34. In general, the length of the bore section 40 should approximate the distance between the supported ends of the seal 32 to prevent longitudinal movement or "walking" of the seal 32 during back and forth movement of the cable section 20 and to avoid unordinary stresses on the seal 32. The edges 32b of the seal element 32 are separated by a cavity which allows the fluid pressure, if any, within the centrally located bore section 41 to force the edges 32b into respective engagement with the exterior surface of the cable section 20 and the interior surface of the bore section 40. In the preferred embodiment, the seal member 32 is constructed of a rubbery, urethane material manufactured by the Parker Seal Company.

The secondary seal member 32 is retained in part by the alignment sleeve or disc 34. The sleeve 34 is a generally annular element having a center opening extending around the cable section 20. The sleeve 34 is disposed within the cylindrical bore portion 41 with one end adapted for engagement with the shoulder portion 45. The sleeve 34 functions to separate the seal elements 32 and 35 and to form a surface for supporting and retaining the rearward surface of the primary seal 35. The sleeve 34 also functions to define a drain area between the primary and secondary seals through which fluid leaking past the primary seal 35 can flow through the drain ports 48 and peripheral channel 49 and into a low pressure reservoir (not shown). The dimensions of the central hole in the sleeve 34 are slightly greater than the diameter of the cable section 20 thereby allowing free movement of the cable 20 through the sleeve 34, and the outer dimensions of the sleeve 34 are slightly smaller than the bore section 41 allowing fluid leaking past the primary seal 35 to drain from the seal assembly through the drain ports 48. In the preferred embodiment, the sleeve 34 is constructed of a material such as Delrin or its equivalent.

Positioned adjacent to the alignment sleeve 34 and within the bore section 41 is the primary seal member which is comprised of the seal element 35 and the "O" ring member 33. The seal member 35 is a U-cup type seal member having an outer edge 35b adapted for sealing engagement with the inner surface of the cylindrical bore section 41 and an inner edge 35a adapted for sealing engagement with the exterior surface of the cylindrical cable section 20. Disposed on the forward face of the element 35 toward the chamber 14 (the pressure side of the element 35) is a generally circular groove into which the "O" ring 33 is seated. In the preferred embodiment, the seal member 35 is constructed of a rubbery, urethane material and is manufactured by the Parker Seal Company. When properly disposed within the gland 31, the edges 35a and 35b of the seal element 35 are disposed toward the pressure chamber 14. The "O" ring 33 is seated within the recessed area of the seal member 35 between the edges 35a and 35b and functions to bias such edges into engagement with the outer surface of the cable section 20 and the inner surface of the cylindrical bore portion 41, respectively.

A gland cap or seal retaining sleeve 36 is positioned adjacent to the seal member 35 on the pressure side thereof. The retaining sleeve member 36 is a generally annular plug-like structure having a cylindrical outer surface portion 50 slightly smaller than the interior diameter of the cylindrical bore section 42, a short neck portion 54 with an exterior diameter less than the diameter of the annular portion 50 and a cap portion 52 defining the end of the sleeve 36. The cap portion 52 includes a flange portion extending radially outwardly from the neck 54 in close proximity to the forward end of the gland 31. In the preferred embodiment, the flange portion is spaced from the end of the gland 31, when the sleeve 36 is fully inserted therein, to permit a screwdriver or other means to be inserted between the flange and the end of the gland to pry the retainer sleeve 36 out of the gland when disassembly of the seal is desired.

As shown in FIGS. 2 and 3, the cylindrical bore portion 42 of the gland includes an internal rib 51 extending completely around the inner surface of the bore portion 42. This rib 51 functions to retain the sleeve member 36 in the position illustrated in FIG. 2 by engaging the neck portion 54 of the sleeve 36. When the sleeve 36 is in its retaining position, the end of the sleeve 36 away from the pressure chamber 14 abuts against the shoulder 46 separating the bore sections 41 and 42 and the rib 51 seats in the neck portion 54. In the preferred embodiment, the retainer sleeve 36 is constructed of a material such as Nylon or Delrin or their equivalent.

As illustrated best in FIG. 3, it can be seen that the gland member 31 includes a plurality of slots 60 in the forward end thereof permitting limited expansion thereof. This limited expansion allows the retainer sleeve 36 to be inserted into the gland and retained therein as a result of engagement between the internal rib 51 and the neck portion 54. The extent to which the sleeve 36 is retained in the gland 31 is dependent to some degree upon the flexibility of the material from which the gland is constructed, the number of slots 60 in the forward end of the gland 31 and the depth of the rib 51. In general, the combination of these factors should be effective to provide enough mechanical lock on the retainer sleeve 36 to prevent the same from being forced out of its retaining position during normal operation of the cable cylinder.

As shown in FIG. 2, when the sleeve 36 is in its retaining position, its end away from the pressure chamber 14 abuts or is closely adjacent to the shoulder 46. In this position, the rearward face of the sleeve 36 functions to partially support the seal member 35 and prevent its forward movement during movement of the cable section 20 toward the right. In the preferred embodiment, the length of the bore section 41 should approximate the length of the alignment sleeve 34 plus the distance between the supportive surfaces of the seal member 35. If the length of the bore 42 is greater than the combined length of the sleeve 34 and seal 35, the seal 35 will have a tendency to move or "walk" during movement of the cable, whereas if it is less than this combined length, unordinary stress will be placed on the seal 35. Both of these conditions should preferably be avoided.

Having now described the structure of the present invention in detail, the operation may be understood as follows:

First, the seal mechanism of the present invention is assembled by appropriately positioning the gland member 31 and then the primary and secondary seals 35 and 32, the alignment sleeve 34 and the retainer sleeve 36 on the cable section 20. When this is completed, the members 32, 34 and 35 are disposed within the gland members 31 and the retainer sleeve 36 is inserted into the forward end of the gland by exerting an appropriate force on the flanged end 52. This causes the sleeve 36 to be forced past the internal rib 51 so that the rib 51 seats within the neck portion 54 and retains the sleeve 36 and the members 32, 34 and 35 within the gland 31. The seal assembly is then complete and ready for operation. During operation, hydraulic fluid pressure is selectively introduced into the chambers 14 and 15 for moving the piston 12 back and forth along the cylinder. Pressure within the chamber 14 is prevented from leaking therefrom by the primary seal 35. In particular, the edges 35a and 35b form a seal with the exterior surface of the cable section 20 and the interior surface of the bore portion 41, respectively. If some of the fluid in chamber 14 should leak past the primary seal 35, it drains into the drain port 48 and around the annular channel 49 to an appropriate low pressure reservoir. The secondary wiper seal 32 through its edges 32b also forms a seal between the exterior surface of the cable section 20 and the interior surface of the bore portion 40 to prevent fluid leaking past the primary seal 35 from leaking out of the seal assembly. Accordingly, the seal 32 causes this fluid which leaks past the primary seal 35 to drain through the drain ports 48. The secondary seal 32 also includes a wiper edge 32a which prevents dirt and dust from entering the seal assembly. The entire gland 31 together with its seal and retaining elements is retained within the cable cylinder housing 16 by an appropriate locking ring or washer 55 as previously described. The "O" rings 38 and 39 prevent the leakage of any fluid from the chamber 14 between the housing 16 and the exterior surface of the gland 31.

If the seal assembly is desired to be disassembled for inspection, repair or replacement, the lock ring 54 is removed and the entire seal assembly retracted from the housing 16. An appropriate tool such as a screwdriver is then used to manually pry the retaining sleeve 36 from its mechanically locked position. The seal members 32 and 35 and the alignment sleeve 34 can then be removed for inspection, repair or replacement and can easily be reassembled into working order in the manner discussed above if desired. Thus, with the present invention, the seal assembly can be easily assembled and disassembled for inspection, repair or replacement.

Although the description of the preferred embodiment has been quite specific, it is contemplated that various modifications could be made to the structure of such embodiment without deviating from the spirit of the present invention. Accordingly, it is intended that the scope of the present invention be dictated by the appended claims rather than by the description of the preferred embodiment.

I claim:

1. A seal assembly for use in a cable cylinder to form an effective seal about a generally cylindrical cable, said seal assembly comprising:
   a gland having a centrally located bore extending around said generally cylindrical cable;
   first and second seal members disposed within the central bore of said gland for forming an effective seal with the inner surface of said central bore and the outer surface of said generally cylindrical cable;
   an alignment sleeve having a center opening extending around said generally cylindrical cable and disposed within the central bore of said gland between said first and second seal members; and
   a retaining sleeve member having a center opening extending around said generally cylindrical cable and mechanical lock means cooperating with corresponding mechanical lock means of said gland for forming a mechanical lock between said retaining sleeve member and said gland upon insertion of said retainer sleeve into a portion of the central bore of said gland for retaining said seal members and said alignment sleeve in operative position within the central bore of said gland.

2. The seal assembly of claim 1 wherein one of said mechanical lock means includes a circumferential rib and the other of said mechanical lock means includes a circumferential groove for engagement by said circumferential rib.

3. The seal assembly of claim 2 wherein the central bore of said gland includes a circumferential rib and said retainer sleeve member includes a circumferential groove for engagement by said rib.

4. The seal assembly of claim 3 wherein said retaining sleeve includes a flange portion extending radially outwardly therefrom and spaced from the end of said gland when said retaining sleeve is inserted within said gland.

5. The seal assembly of claim 4 wherein said gland includes a plurality of slots extending longitudinally along the gland for a limited distance from the forward end of said gland to give a portion of said gland flexibility and to permit said retaining sleeve member to be inserted into said central bore and said circumferential rib to seat in said circumferential groove.

6. The seal assembly of claim 1 wherein said first seal member is a primary seal member positioned adjacent to said retainer sleeve member and forming an effective seal between the outer surface of said cable and the interior surface of said central bore and wherein said second seal member is a secondary seal member positioned downstream from said primary seal member and forming an effective seal between the outer surface of said cable and the interior surface of said central bore.

7. The seal assembly of claim 6 having a drain port between said primary and secondary seals.

8. The seal assembly of claim 7 wherein said centrally located bore includes a plurality of generally cylindrical bore portions and wherein said secondary seal member is disposed within a first generally cylindrical bore portion, said primary seal member and said alignment sleeve are disposed within a second generally cylindrical bore portion and said retaining sleeve member is partially disposed within a third generally cylindrical bore portion.

9. The seal assembly of claim 8 wherein said primary seal member is supported and retained by a rearward annular surface of said retaining sleeve member and a forward annular surface of said alignment sleeve and said secondary seal member is supported and retained by a rearward annular surface of said alignment sleeve and a shoulder portion in said gland.

10. A cable cylinder comprising:
   a cylinder;
   a piston disposed within said cylinder and defining at least one hydraulic chamber;
   a generally cylindrical cable connected with said piston and extending through said hydraulic chamber; and
   a seal assembly for forming an effective seal about said cylindrical cable comprising:
      a gland having a centrally located bore extending around said generally cylindrical cable;
      first and second seal members disposed within the central bore of said gland for forming an effective seal with the inner surface of said central bore and the outer surface of said generally cylindrical cable;
      an alignment sleeve having a center opening extending around said generally cylindrical cable and disposed within the central bore of said gland between said first and second seal members; and
      a retaining sleeve member having a center opening extending around said generally cylindrical cable and mechanical lock means cooperating with corresponding mechanical lock means of said gland for forming a mechanical lock between said retaining sleeve member and said gland upon insertion of said retainer sleeve into a portion of the central bore of said gland for retaining said seal members and said alignment sleeve in operating position within the central bore of said gland.

* * * * *